(12) United States Patent
Gundewar et al.

(10) Patent No.: US 6,381,610 B1
(45) Date of Patent: Apr. 30, 2002

(54) SYSTEM AND METHOD FOR IMPLEMENTING PROJECT PROCEDURES

(76) Inventors: Unmesh B. Gundewar, 8 Flint Dr., Marlboro, MA (US) 01752-6701; Raymond K. Tang, 740 Newton St., Chestnut Hill, MA (US) 02467

( * ) Notice: Subject to any disclaimer, the term of this patent is extended or adjusted under 35 U.S.C. 154(b) by 0 days.

(21) Appl. No.: 09/236,289

(22) Filed: Jan. 22, 1999

(51) Int. Cl.[7] .............................................. G06F 17/30
(52) U.S. Cl. ........................... 707/104; 707/10; 707/3; 709/203; 709/219; 705/10; 705/54
(58) Field of Search ....................... 708/1, 201; 707/10, 707/104, 3; 713/200; 705/400, 54, 7; 706/45, 906, 914, 10; 709/315, 330, 203, 219

(56) References Cited

U.S. PATENT DOCUMENTS

| | | | | |
|---|---|---|---|---|
| 5,321,610 A | * | 6/1994 | Breslin ................. | 364/419.19 |
| 5,530,861 A | * | 6/1996 | Diamant et al. ............ | 395/650 |
| 5,572,642 A | * | 11/1996 | Nasu ........................... | 395/118 |
| 5,826,252 A | * | 10/1998 | Wolters et al. ................. | 707/1 |
| 5,900,870 A | * | 5/1999 | Malone et al. .............. | 345/333 |
| 6,041,303 A | * | 3/2000 | Mathews ...................... | 705/1 |
| 6,154,753 A | * | 10/2000 | McFarland .................. | 707/508 |
| 6,161,113 A | * | 12/2000 | Mora et al. ................. | 707/505 |

\* cited by examiner

*Primary Examiner*—Jean M. Corrielus
(74) *Attorney, Agent, or Firm*—Baker Botts LLP

(57) ABSTRACT

A method for automated project planning comprises displaying a list of procedure identifiers representing a plurality of procedures at a client and communicating a procedure identifier selected by a user from the client to a server. The method further comprises displaying a procedure data sheet at the client in response to the selected procedure identifier, the procedure data sheet including a list of procedure steps for the selected procedure identifier and at least one of the listed procedure steps including a template identifier. The method also comprises communicating the template identifier selected by the user from the client to the server and displaying a template at the client in response to the selected template identifier, the template including data fields for completion by the user. The method further comprises communicating the template having completed data fields from the client to the server and updating a project workspace with the completed template.

17 Claims, 2 Drawing Sheets

SYSTEM AND METHOD FOR IMPLEMENTING PROJECT PROCEDURES

TECHNICAL FIELD OF THE INVENTION

The present invention relates in general to the field of engineering, and more particularly to a system and method for implementing project procedures.

BACKGROUND OF THE INVENTION

In managing complex engineering and design projects, such as the development of computer software, a wide variety of factors such as corporate policies, industry standards, available personnel and resources, and other outside forces and risks need to be assessed. Currently, the practice of project management is one for which little training is provided to project managers. Even when adequate training is provided for project managers, many project managers still face difficulties initiating projects and applying processes systematically throughout the life cycle of project planning and implementation. Often a project manager will have to assess standards and required procedures in light of a current product by referring to a myriad of sources of documentation and instructions. A project manager therefore faces many problems in project management that may have little to do with the typical concerns of allocating resources, planning a project life cycle, and specific technical issues relating to a particular project. Thus, it is actually in the area of planning project procedures, project activities, requirement definitions, and risk or impact studies that a project manager typically has the most difficulty with when beginning a new project. While several project management tools are available that allow a project manager to plan and monitor the life cycle of a particular project, or even to allow the project manager to track the work flows involved during a project's implementation, no help is given to a project manager for developing project procedures that can be applied on a consistent and objective basis in order to meet corporate policies and industry guidelines. Often such project procedures are as important, if not more important, than concerns associated with project life cycle, project work flow, or technical development.

SUMMARY OF THE INVENTION

In accordance with the present invention, the disadvantages and problems associated with systems and methods for implementing project procedures have been substantially reduced or eliminated.

In one aspect of the present invention, a method for automated project planning comprises displaying a list of procedure identifiers representing a plurality of procedures at a client and communicating a procedure identifier selected by a user from the client to a server. The method further comprises displaying a procedure data sheet at the client in response to the selected procedure identifier, the procedure data sheet including a list of procedure steps for the selected procedure identifier and at least one of the listed procedure steps including a template identifier. The method also comprises communicating the template identifier selected by the user from the client to the server and displaying a template at the client in response to the selected template identifier, the template including data fields for completion by the user. The method further comprises communicating the template having completed data fields from the client to the server and updating a project workspace with the completed template.

In another aspect of the present invention a system for automated project planning comprises a task database operable to store a list of tasks and a template database operable to store a list of templates associated with the tasks. The system also comprises a project repository module in communication with the task database and template database and operable to automate completion of the tasks by completing at least one template. The system further comprises a project workspace in communication with the project repository module and being operable to store the completed template.

In yet another aspect of the present invention a method for automated project planning comprises displaying a list of procedure links representing a plurality of procedures on a web browser at a client and displaying a procedure data sheet page on the web browser at the client in response to the procedure link being selected by a user, the procedure data sheet page including a list of procedure steps for the selected procedure identifier and at least one of the listed procedure steps including a template link. The method further comprises displaying a template on the web browser at the client in response to the template link being selected by the user, the template including data fields for completion by the user using the web browser. The method also comprises communicating the template having completed data fields from the client to the server and updating a project workspace with the completed template.

BRIEF DESCRIPTION OF THE DRAWINGS

A more complete understanding of the invention and its advantages will be apparent from the detailed description taken in conjunction with the accompanying drawings in which.

DETAILED DESCRIPTION OF THE INVENTION

The preferred embodiments of the present invention and its advantages are best understood by referring to FIGS. 1–4 of the drawings, like numerals being used for like and corresponding parts of the various drawings.

Figure 1:
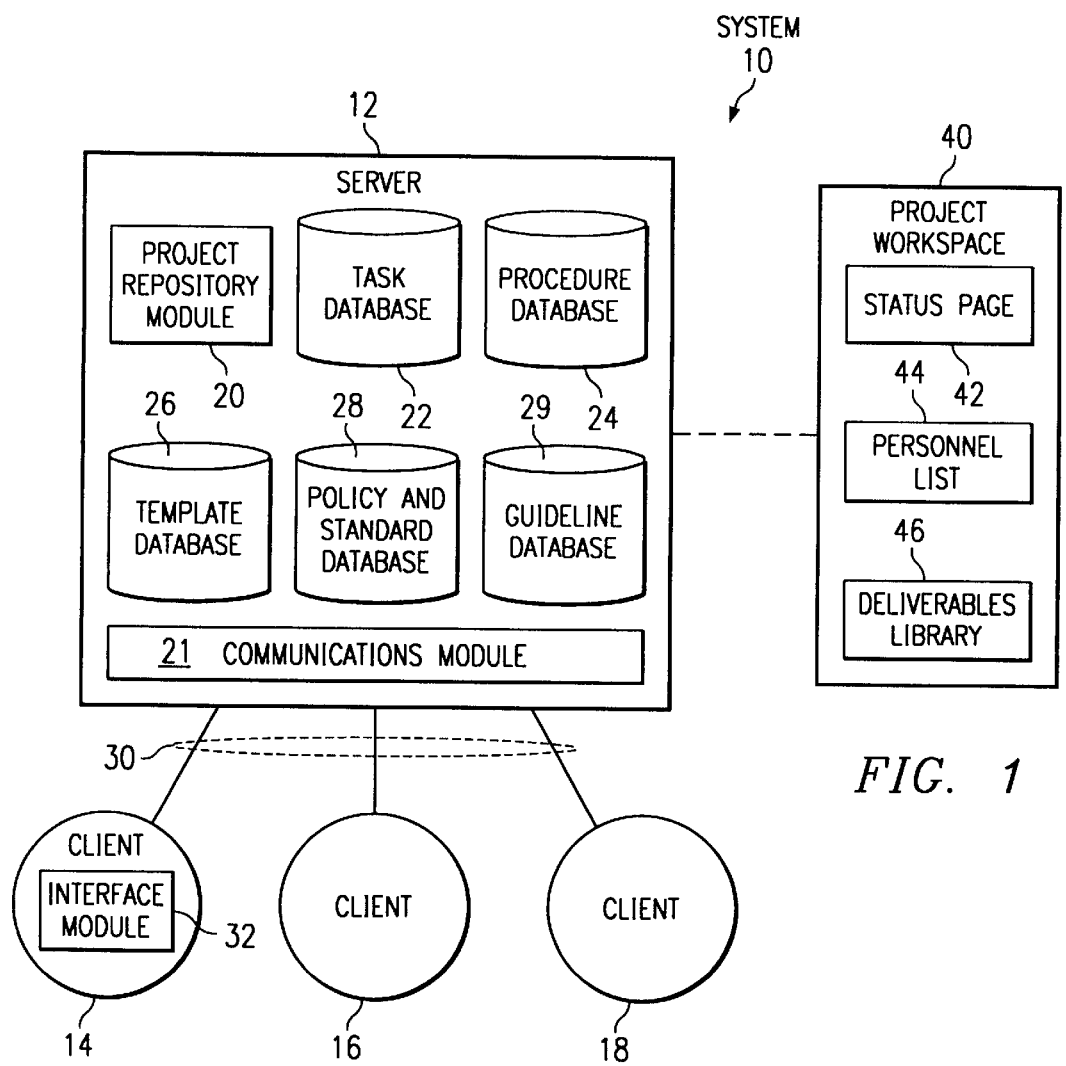
FIG. 1 is an illustrative example of a block diagram of a system for automating project planning tasks and procedures according to the teachings of the present invention.

FIG. 1 is a embodiment of a block diagram of a system 10 for automating project planning tasks and procedures according to an embodiment of the present invention.

System 10 includes a server 12 coupled to a variety of clients 14, 16 and 18, referred to generally as clients 14. Clients 14 communicate with server 12 using hardware and software associated with a link 30. Although server 12 and clients 14 are referred to in the nomenclature of a client/server environment, it should be understood that server 12 and clients 14 may be any type of computer operating in any suitable environment that communicate using communication link 30. For example, the components in system 10 may be arranged in a peer-to-peer computing environment, or other suitable environment that supports communication among different components in system 10.

Server 12 comprises a project repository module 20 integrated or associated with a task database 22, a procedure database 24, a template database 26, a policy and standard database 28, and a guideline database 29. Server 12 further comprises a communications module 21 coupled to communications link 30 that supports communication between clients 14 and the various components of server 12. Clients 14 each comprise an interface module 32, such as a web browser, operable to provide a user with an interface to access and manipulate the resources of server 12.

Communication link 30 may be a dedicated or switched link over a public switched telephone network (PSTN), a satellite link, a microwave link, or other appropriate communications link between clients 14 and server 12. The components of system 10 may be part of a local area network (LAN), wide area network (WAN), or other suitable network of interconnected computing devices. In a particular embodiment, components in system 10 communicate over the Internet using the World Wide Web (WWW), file transfer protocol (FTP), Telnet, Usenet, Gopher or Archie utility, electronic mail, bulletin boards, or other communication technique. For example, server 12 and clients 14 may maintain and execute a browser or other suitable program for accessing and communicating information addressed by a uniform resource locator (URL) using link 30.

Figure 2:
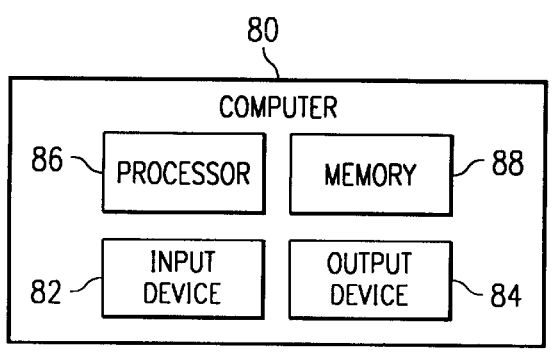
FIG. 2 is an illustrative example of a block diagram of a computer usable to implement the project planning tasks and procedures of the present invention.

Referring to FIG. 2, server 12 and clients 14 may operate on one or more computers, such as computer 80 associated with server 12. Each computer 80 includes an input device 82 such as a keypad, touch screen, mouse, or other pointer or device that can accept information. An output device 84 conveys information associated with the operation of server 12 or clients 14, including digital data, visual information, or audio information. Both input device 82 and output device 84 may include fixed or movable storage media such as a magnetic computer disk, CD-ROM, or other suitable media to both receive output from and provide input to server 12 and clients 14. A processor 86 and its associated memory 88 execute instructions and manipulate information in accordance with the operation of system 10.

Referring again to FIG. 1, system 10 also includes a project workspace 40, associated with a particular project, that is resident within the memory of server 12, client 14, or other server or network device accessible by client 14 over link 30 or another suitable communications link. Project workspace 20 includes modules such as status page 42, personnel list 44, and deliverables library 46.

Each module described in reference to server 12, client 14, and project workspace 40 may comprise any suitable combination of hardware and software in computer 80 to provide the functionality or operation of the module. For example, the modules may include program instructions, associated memory, and processing components to execute program instructions. Also, modules illustrated in FIG. 1 may be separate or integral to other modules.

Databases 22, 24, 26, 28 and 29 and other databases of FIG. 1 not shown or inherent to the modules of system 10 may comprise one or more files, data structures, lists, or other arrangement of information stored in one or more components of random access memory (RAM), read only memory (ROM), magnetic computer disk, CD-ROM, other magnetic or optical storage media, or any other volatile or non-volatile memory. Although FIG. 1 illustrates databases 22, 24, 26, 28 and 29 as internal to server 12, it should be understood that databases of system 10 may be internal or external to the illustrated components of system 10, depending on the particular implementation. Also, databases illustrated in FIG. 1 may be separate or integral to other databases. Any appropriate referencing, indexing or addressing information can be used to relate back to an address or location of a database, file or object within system 10.

The modules and databases of system 10 may be implemented in a programming environment that supports access or linking to various sources of information in system 10 using URL addresses. As such, content of such modules and databases may be constructed using hypertext mark-up language (HTML), standard generalized mark-up language (SGML), virtual reality mark-up language (VRML), JAVAscript, or any other appropriate content development language. The modules of system 10 may also include program code, such as applets written in JAVA, or other appropriate self-executing code.

In general, system 10 allows a user to complete project planning tasks and procedures in accordance with company or industry standards without requiring the user to be familiar with such standards. By using the components of system 10, a user assigned to the planning of one or more project tasks is guided through an associated process or procedure in such a manner that company and industry standards are adhered to without a user having to compile, sort, and determine the applicability of such standards at each step of project planning and execution.

In operation, the users of system 10 access and utilize project repository module 20 via client 14 and interface module 32 to develop a particular project plan using the resources of task database 22, procedure database 24, template database 26, policy and standard database 28, and guideline database 29. Generated using project repository module 20, the status, parameters, and deliverables associated with the particular project plan are maintained and accessible in project workspace 40.

Figure 3:
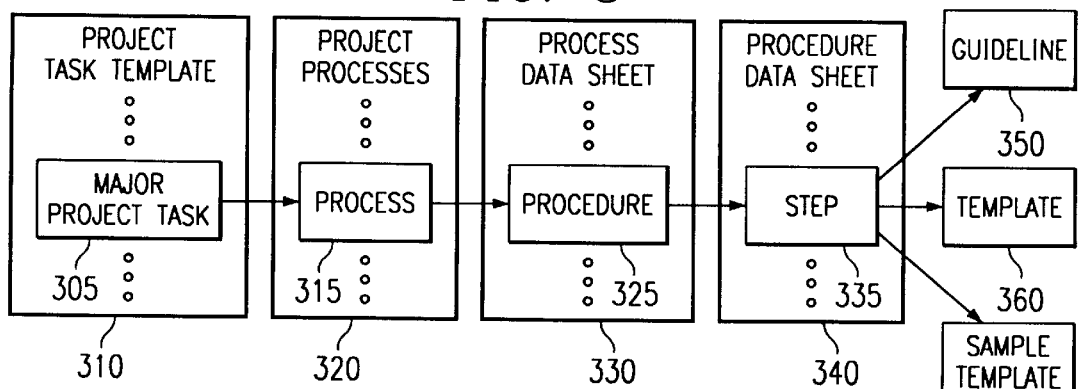
FIG. 3 is a representative diagram of a series of views of particular data displays of the present invention.

In particular, a project manager or another user of system 10 accesses a specific project repository module 20 and initiates project planning for a Project X. Project repository module 20 presents the user with a project task template from task database 22. The project task template includes a list of major project tasks that may be associated with Project X and that are organized according to various stages of project planning. In some cases a project planning stage is itself a major project task. Each of such major project tasks is selectable by the user in order to display a list of smaller tasks or processes that are associated with the major project task. FIG. 3 shows an embodiment of a task 305 in a project task template 310 that is selectable to display a list of processes 320. An example project task template is illustrated below in Table A. The project task template of Table A shows major project tasks under the planning stages of Define, Analyze, Design, Produce, Optimize, Implement, and Manage:

TABLE A

Task Name
Define
    Perform Project Start-Up
    Define Business Need - [Requirements gathering]
    Perform Project Planning
Analyze
    Plan/Prepare to Analyze
    Assess Current Situation
    Refine Business Requirements
    Analyze Logical Systems Components
Design
    Plan/Prepare to Design
    Design Technical Architecture
    Design Application
    Design Business Organization TABLE A-continued Develop Strategies for Conversion/Migration
Produce
    Plan/prepare to Produce
    Produce Automated Components
    Produce Business Organization Cqmponents
    Integrate System Components
Optimize
Implement
Manage
    Administer Plans and Schedules
    Manage and Coznmunicate Performance Table B shows example processes associated with the major project tasks under the Define project planning stage:

TABLE B

Task Name
Define
    Perform Project Start-Up
        DeveloplReview B P A
        Develop Project Summary
        Review Project Summary
        Establish Initial Project Team
        Establish Initial Project Environment
        Create Initial Project Plan
        Establish Proj Relationship with Cust
        Review Initial Project Plan
        Conclude Project Start-up Activities
            Issue Project Announcement
            Manage Project Start-up Activities
            Deliverable Walkthroughs & Verification
    Define Business Need - [Reqts gathering]
        Describe Business Problem/opportunity
        Define Scope of Business Need
        Determine Impact of Business Need
        Outline Project Scope
    Perform Project Planning
        Develop Allocated Requirements
        Identify/Assess Proj. Risks and Update Risk
        Evaluate Options & Recommend Solution
        Define Project Plan
        Conduct Project Plan Walkthrough/Peer Review
    Perform Checkpoint Review Each process can in turn be selected by a user in order to allow a user to view information and execute procedures related to the particular process. For example, after selecting a particular process, a user may be presented with a process data sheet including the purpose of the process, a brief description of the process, and an identification of the process owner or project member who is ultimately responsible for the process. FIG. 3 shows a process 315 in list of processes 320 selectable to display a process data sheet 330. The process data sheet may also include a list of necessary inputs to the process, a list of process outputs and/or deliverables and entry and exit criteria for the process. The list of necessary inputs typically includes completed templates from earlier processes or other collected data or information. Process outputs may include templates completed during the current process and other data collected as a result of the process. Entry and exit criteria may include milestones, approvals, procedure completions, and/or design or production events necessary to enter or exit the particular process. The process data sheet may also present a context for the process as referenced in a flow diagram or other illustrative diagrams that describe the relevance of the process to the project as a whole. Additionally, the process data sheet may indicate resources that are necessary for completing the process and list specific procedures relevant to the process, such as those required to produce outputs and/or deliverables. Entry and exit criteria and process input indications may also have associated status indicators to indicate to a user whether or not such criteria and inputs have been met or collected as required. Any of the data included in the process data sheet may also have identifiers that may be referenced by a user to disclose more details associated with the data in a related data sheet, for example, or external window or page. For example, a user can review inputs by looking at actual completed templates in a window that are displayed by project repository module 20 after accessing deliverables library 46 in project workspace 40. An example of a portion of a process data sheet having examples of some of the described data types is illustrated below in Table C. The particular project data sheet of Table C illustrates data categories that can be accessed in the example process of "Perform Project Risk Assessment":

TABLE C

Process: Perform Project Risk Assessment

| Purpose/Goals | Description | Entry-criteria |
|---|---|---|
| Owner/Agent | Inputs | Exit-criteria |
| Resources | Outputs/Deliverables | Context/Flow Diagram |
| Major Tasks | Audience | Process-Owner |

Specific procedures listed for a process are selectable by a user from the process data sheet when such procedure is to be initiated. Such selection results in a procedure data sheet from procedure database 24 being presented to the user. FIG. 3 shows a procedure 325 in process data sheet 330 selectable to display a procedure data sheet 340. The procedure data sheet includes references to a summary of steps and actions associated with the procedure, a more detailed description of the steps and actions, any templates that are to be filled out during the steps and actions, guidelines associated with completing the templates, and sample templates corresponding to the templates. Generally, a user will complete the steps and actions set forth in the detailed description and in accordance with the guidelines. More particularly, a user may select a reference listing the detailed steps and actions from procedure database 24, be prompted with particular guidelines from guideline database 29 where appropriate for a particular step or action, and be presented with further links or selectable references to particular corporate or industry policies or standards from policy and standard database 28 associated with the particular procedure.

The policies and standards in database 28 may include, for example, the Software Engineering Institute's Capability Maturity Model. The guidelines in database 28 may include the definitions or descriptions of terms used in the steps or actions associated with the procedures, and further descriptions of categories or evaluation levels to be used when completing a step or action. The guidelines may also include general user help files or pop-up dialogue boxes containing helpful hints. More particularly, the guidelines should include any additional standards, documentation, quality assurance and/or other precautions a user should employ when completing a procedure item that are not immediately obvious from a step or action description. Such standards, documentation, quality assurance and/or other precautions ensure that a user complies with applicable policies and standards from policy and standard database 28 without requiring actual reference to such policies and standards. However, as mentioned, such policies and standards are available for review by the user in electronic format for further reference. More particularly, a particular procedure may include a reference or link to the particular portions of all policies and standards that are relevant to the particular procedure.

At some point in the detailed description of the procedure data sheet, a user may need to complete a step or action that requires generating a worksheet or other deliverables from a template in template database 26. Upon reaching such a step or action, a user may be presented with a sample template from template database 26 and a template to be filled out for the current project of the user. The sample template, template to be filled out, and prompted guidelines related to filling out the template may all be displayed simultaneously to the user, such that the user can electronically submit the necessary inputs and other data to complete the template. FIG. 3 shows a procedure step 335 selectable to display a guideline 350, a template 360 and a simple template 370. When the template is complete, the completed template deliverable is communicated to workspace 40 and stored in deliverable library 46.

Some steps and actions in a particular procedure may require intervention by other users before project repository module 20 will allow a user to continue to the next step or action. For example, it may be desirable that several project team members may be required to complete a template on risk evaluation to ensure adequate coverage of risk assessment in all aspects of project implementation. When a user such as a project manager reaches such a step, project repository module 20 may request that the project manager fill out a first template merely identifying such project team members and a contact reference where the members can be reached. Such a template may identify electronic mail addresses of particular project members assigned to risk assessment. Project repository module 20 may then generate and initiate electronic mail communication to such team members that either notifies such members to access server 12 and complete risk evaluation templates or else encloses electronic copies of the templates. When all of such templates have either been filled out online by team members or submitted to project repository module 20 by electronic mail, project repository module 20 may collate and summarize their responses and then allow the project manager to continue to the next step or action associated with the procedure.

Project repository module 20 may be configured to allow a project manager to assign owners to particular processes. Project repository module 20 may thereafter be configured to allow the project manager or process owner to complete templates or complete other steps or actions related to the procedures of that process. Such assignments, and other designations of personnel during project planning, can be updated by project repository module 20 to personnel list 44 of project workspace 40. For example, project repository module 20 may be configured to allow access to a particular procedure in response to an asserted user identification and security string. Project repository module 20 may also be configured to notify identified project team members when particular project tasks, processes, procedures or templates are completed. Such notification, and other notification referred to herein, can be conducted via electronic mail, page, voice mail, targeted network broadcast, intercom, instant messaging, Internet paging, ICQ, or other communications means. Project repository module 20 may also communicate the overall status of project planning to particular team members at regular intervals, and may store an exact status of tasks and available deliverables in status page 42 of project workspace 40. Project repository module 20 may also be configured to allow particular processes to be initiated by team members when the requisite entry criteria and required inputs are available. Other ways of restricting use of project repository module 20 and automating additional features common to project development may easily be adapted into system 10 without departing from the scope of this invention.

Project workspace 40 is also accessible via interface module 32 of client 14. In particular, a user of client 14 may access all currently archived deliverables from deliverables library 46, review project personnel and their assigned responsibilities from personnel list 44, and review a detailed project status from status page 42.

Figure 4:
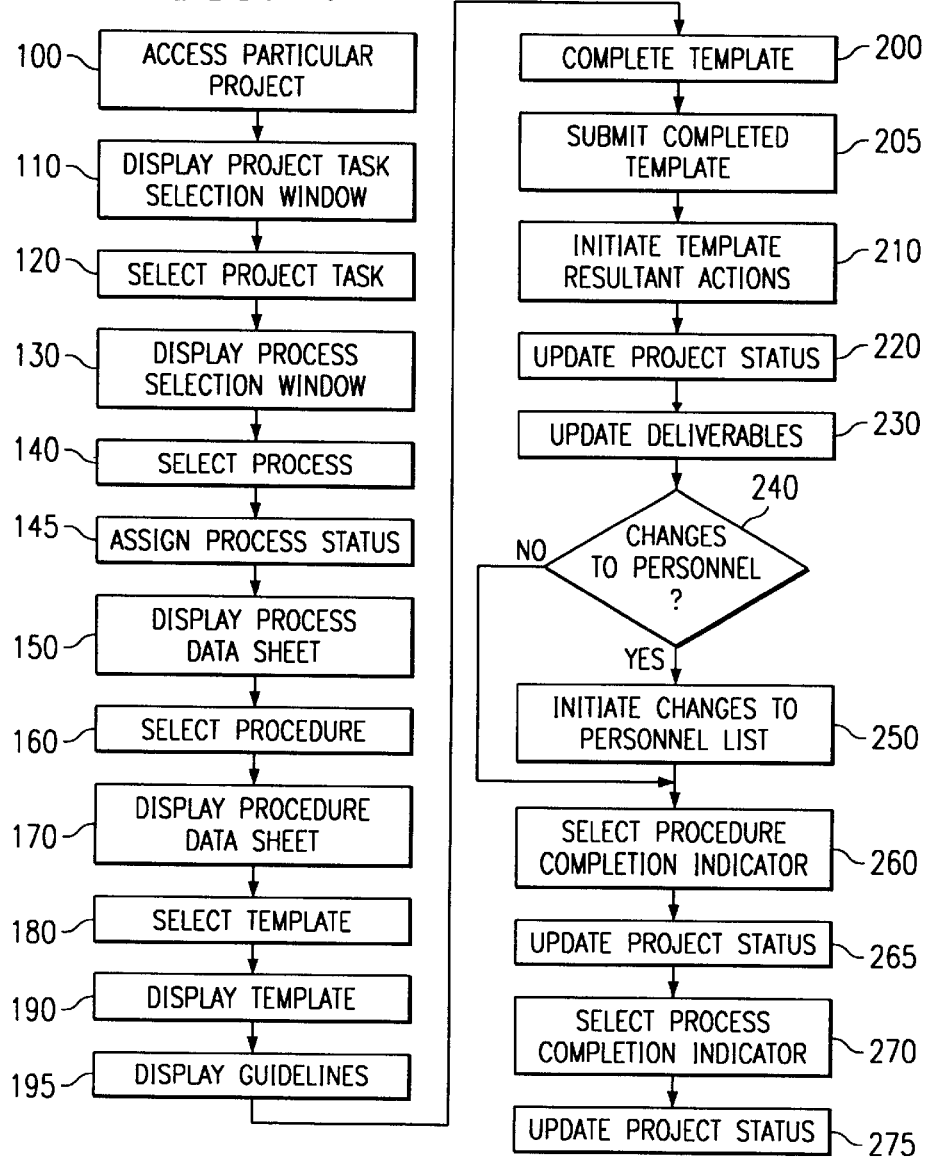
FIG. 4 is an illustrative example of a flowchart for a method of automating project planning tasks and procedures according to the teachings of the present invention.

In FIG. 4, an embodiment of a flowchart of a method for automating project planning tasks and procedures according to the present invention is shown. In step 100, a user accesses a particular project in project repository module 20 using client 14. This selection is conveyed to project repository module 20 across communications link 30. Project repository module 20 responds by accessing task database 22 and obtaining task data for the particular project, communicating the task data to client 14, and, in step 110, displaying a project task selection window at client 14 that includes a list of major project tasks. In step 120, the user selects a particular project task identifier from the selection window that is communicated to project repository module 20. In step 130, project repository module 20 responds by displaying a process selection window at client 14 that lists processes associated with the selected project task. In step 140, the user selects a process identifier from the process selection window that is communicated to project repository module 20. In step 145, project repository module 20 responds to the selected process identifier by assigning a process status to the selected process based on a query sent to status page 42 of project workspace 40. In step 150, a process data sheet is displayed by project repository module 20 to the user at client 14 that includes the process status.

In step 160, a user selects a particular procedure from the process data sheet that is communicated to project repository module 20 from client 14. In step 170, a procedure data sheet is displayed by project repository module 20 on client 14 in response to the selection. In step 180, a user selects a particular template from the procedure data sheet. In step 190, the particular template is presented to the user on client 14 in a template window. In step 195, guidelines associated with the particular template are presented on client 14 in a guideline window. In step 200, the user directly enters data on the template in the template window. In step 205, the user submits a completed template by selecting a submit indicator or otherwise identified input mechanism.

In step 210, project repository module 20 initiates actions in response to the submission of the template. For example, if the template completed by the user identifies team members and associated contact information in order to solicit risk assessment feedback from such team members, project repository module 20 may generate additional templates for each of such team members and deposit such templates in a work directory for each team member, attach such templates to electronic mail routed to such team members, or otherwise ensure that each team member has access to such template. Project repository module 20 may also initiate notification procedures through any available communications means. Project repository module 20 may then restrict further completion of the particular procedure or subsequent procedures until all templates have completed and submitted, by electronic mail for example, by team members. Project repository module 20 may also automatically process all of such templates and generate a summary template based on the data in each of such templates. The summary template and team member templates may all be stored in project workspace 40.

In step 220, project repository module 20 updates the status of the project in status page 42 of project workspace 40 in response to the template being submitted in step 205. In step 230, project repository module 20 updates deliverables library 46 of project workspace 40 in response to the template being submitted in step 205. In step 240, project repository module 20 determines if the template submitted in step 205 changes any data listed in personnel list 44. In step 250, if changes are required, project repository module initiates changes to personnel list 44. In step 260, after the user has completed all steps and actions related to a procedure, the user selects a procedure completion indicator thereby notifying project repository module 20 that the procedure has been completed.

In step 265, project repository module 20 updates status page 42 in response to the selected procedure completion indicator. In step 270, after all procedures associated with a particular process have been completed, the user selects a process completion indicator thereby notifying project repository module 20 that the process has been completed. In step 275, project repository module 20 updates status page 42 of project workspace 40 in response to the selected process completion indicator.

For purposes of this invention, items identified herein as identifiers may include icons, buttons, links, filenames or any other means of indicating to system 10 that a particular set of data has been selected. Items identified herein as windows or data sheets may include any format for display to a user including windows, dialogue boxes, listings, charts, graphs, web pages, frames, visual tabs, or other viewable arrangement of data.

Although the present invention and its advantages have been described in detail, it should be understood that various changes, substitutions, and alterations can be made therein without departing from the spirit and scope of the invention as defined by the appended claims.

What is claimed is:

1. A method for automated project planning, the method comprising:

displaying a list of procedure identifiers representing a plurality of procedures at a client;

communicating a procedure identifier selected by a user from the client to a server;

displaying a procedure data sheet at the client in response to the selected procedure identifier, the procedure data sheet including a list of procedure steps for the selected procedure identifier and at least one of the listed procedure steps including a template identifier;

communicating the template identifier selected by the user from the client to the server;

displaying a template at the client in response to the selected template identifier, the template including data fields for completion by the user;

communicating the template having completed data fields from the client to the server;

automatically compiling, sorting, and determining applicability of company and industry standards to the completed template transparently from the user;

automatically updating a project workspace with the completed template.

2. The method of claim 1, and further comprising generating notification messages in response to updating the project workspace.

3. The method of claim 1, wherein updating a project workspace comprises updating a status list.

4. The method of claim 1, wherein updating a project workspace comprises updating a deliverables library with the completed template.

5. The method of claim 1, wherein displaying a list of procedure identifiers comprises:

displaying a project task selection window at the client, the project task selection window including a list of project task identifiers;

communicating a project task identifier from the client to the server in response to the project task identifier being selected by a user;

displaying a process selection window at the client in response to the communicated project task identifier, the process selection window including at least one process identifier associated with the selected project task identifier;

communicating one of the at least one process identifiers from the client to the server in response to the one process identifier being selected by the user; and displaying a process data sheet at the client in response to the communicated process identifier, the process data sheet including the list of procedure identifiers.

6. The method of claim 1, and further comprising:

generating a notification message in response to communicating the completed template;

attaching an additional template to the notification message;

communicating the notification message and attached template from the server to the client;

communicating the additional template from the client to the server in response to the user completing and submitting the template;

processing the additional template; and automatically completing a summary template in response to the processed additional template.

7. The method of claim 6, and further comprising updating the project workspace with the additional template and the summary template.

8. The method of claim 6, and further comprising updating a status page in response to the completed summary template.

9. The method of claim 1, wherein displaying a template comprises displaying associated guidelines for completing the template.

10. The method of claim 1, wherein displaying the template comprises displaying a sample template.

11. A method for automated project planning, the method comprising:

displaying a list of procedure links representing a plurality of procedures on a web browser at a client;

displaying a procedure data sheet page on the web browser at the client in response to the procedure link being selected by a user, the procedure data sheet page including a list of procedure steps for the selected procedure identifier and at least one of the listed procedure steps including a template link;

displaying a template on the web browser at the client in response to the template link being selected by the user, the template including data fields for completion by the user using the web browser;

communicating the template having completed data fields from the client to the server;

automatically compiling, sorting, and determining applicability of company and industry standards to the completed template transparently from the user;

automatically updating a project workspace with the completed template.

12. The method of claim 11, wherein displaying a list of procedure links comprises:

displaying a project task selection page on the web browser at the client, the project task selection page including a list of project task links;

displaying a process selection page on the web browser at the client in response to the project task link being selected by the user, the process selection page including at least one process link; and displaying a process data sheet page on the web browser at the client in response to the process link being selected by the user, the process data sheet page including the list of procedure links.

13. The method of claim 11, and further comprising:

generating a notification message in response to communicating the completed template;

attaching an additional template to the notification message;

communicating the notification message and attached template from the server to the client;

communicating the additional template from the client to the server in response to the user completing or submitting the template;

processing the additional template; and automatically completing a summary template in response to the processed additional template.

14. The method of claim 13, and further comprising updating the project workspace with the additional template and the summary template.

15. The method of claim 13, and further comprising updating a status page in response to the completed summary template.

16. The method of claim 11, wherein displaying a template comprises displaying associated guidelines for completing the template.

17. The method of claim 11, wherein displaying the template comprises displaying a sample template.

* * * * *